United States Patent [19]
Hermsted

[11] Patent Number: 4,969,780
[45] Date of Patent: Nov. 13, 1990

[54] METHOD FOR USING A DIE HOLDER WITH CENTERING AND SQUARING GUIDE TO CUT THREADS ON A CYLINDRICAL WORKPIECE

[76] Inventor: William D. Hermsted, 55 Berg Ave., Kings Park, N.Y. 11754

[21] Appl. No.: 496,281

[22] Filed: Mar. 20, 1990

[51] Int. Cl.$^5$ .............................................. B23G 5/00
[52] U.S. Cl. .................................... 408/1 R; 10/1 R; 10/111; 10/123 P; 408/72 R; 408/221
[58] Field of Search ............ 10/1 R, 1 B, 10 R, 27 R, 10/111, 123 R, 123 P, 123 S; 408/1 R, 69, 72 R, 72 B, 215, 216, 221, 239 R, 241 R, 241 G

[56] References Cited
U.S. PATENT DOCUMENTS
1,436,369  11/1922  Thomas ............................ 10/123 R FOREIGN PATENT DOCUMENTS
1382169  11/1964  France ............................... 10/123 R
211200  9/1923  United Kingdom ............. 10/123 R OTHER PUBLICATIONS
"Three-Hole Locating Gage for Checking Size and Position", Bossman—American Machinist, May 10, 1945, pp. 120,121.

Primary Examiner—E. Michael Combs
Attorney, Agent, or Firm—Michael I. Kroll

[57] ABSTRACT

A method for using a die holder with centering and squaring guide to cut preliminary and final threads on rotatable stationary workpieces is provided and includes a locating pin, a die with set screw, a shim, a die holder with two lock screws, a guide, three bolts, a guide bushing and a gage. The guide bushing presents alot more surface area to guide the workpiece into the die and which holds the workpiece absolutely square to the die throughout operation of making a machine quality thread on the workpiece.

4 Claims, 2 Drawing Sheets

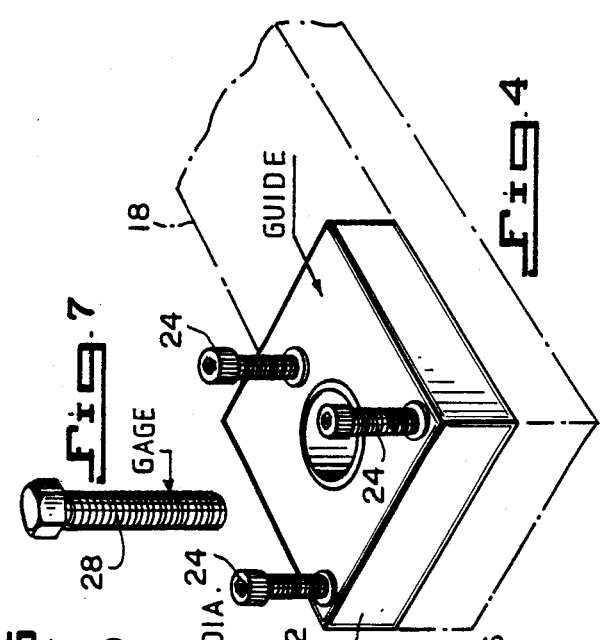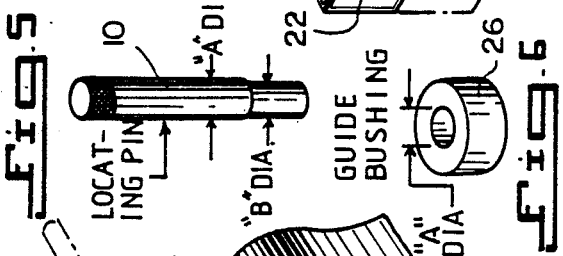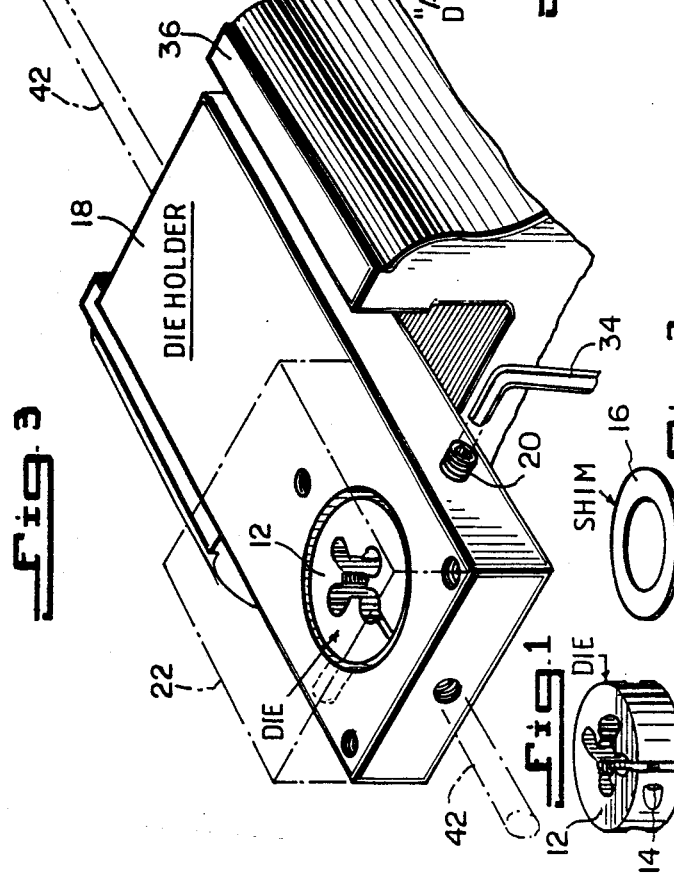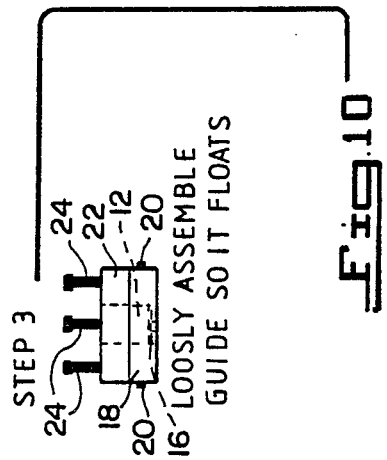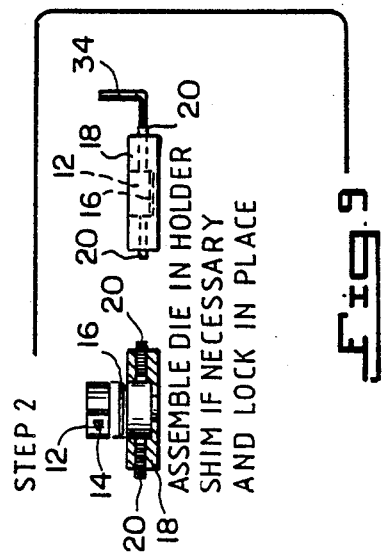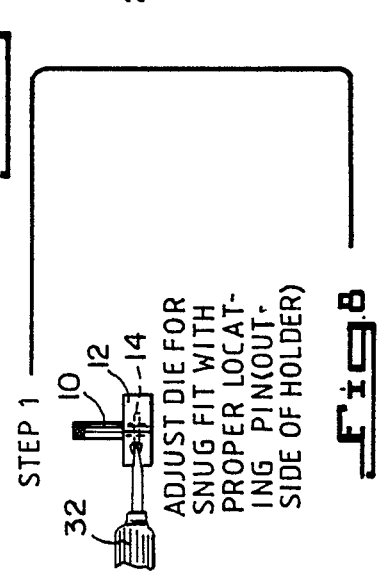

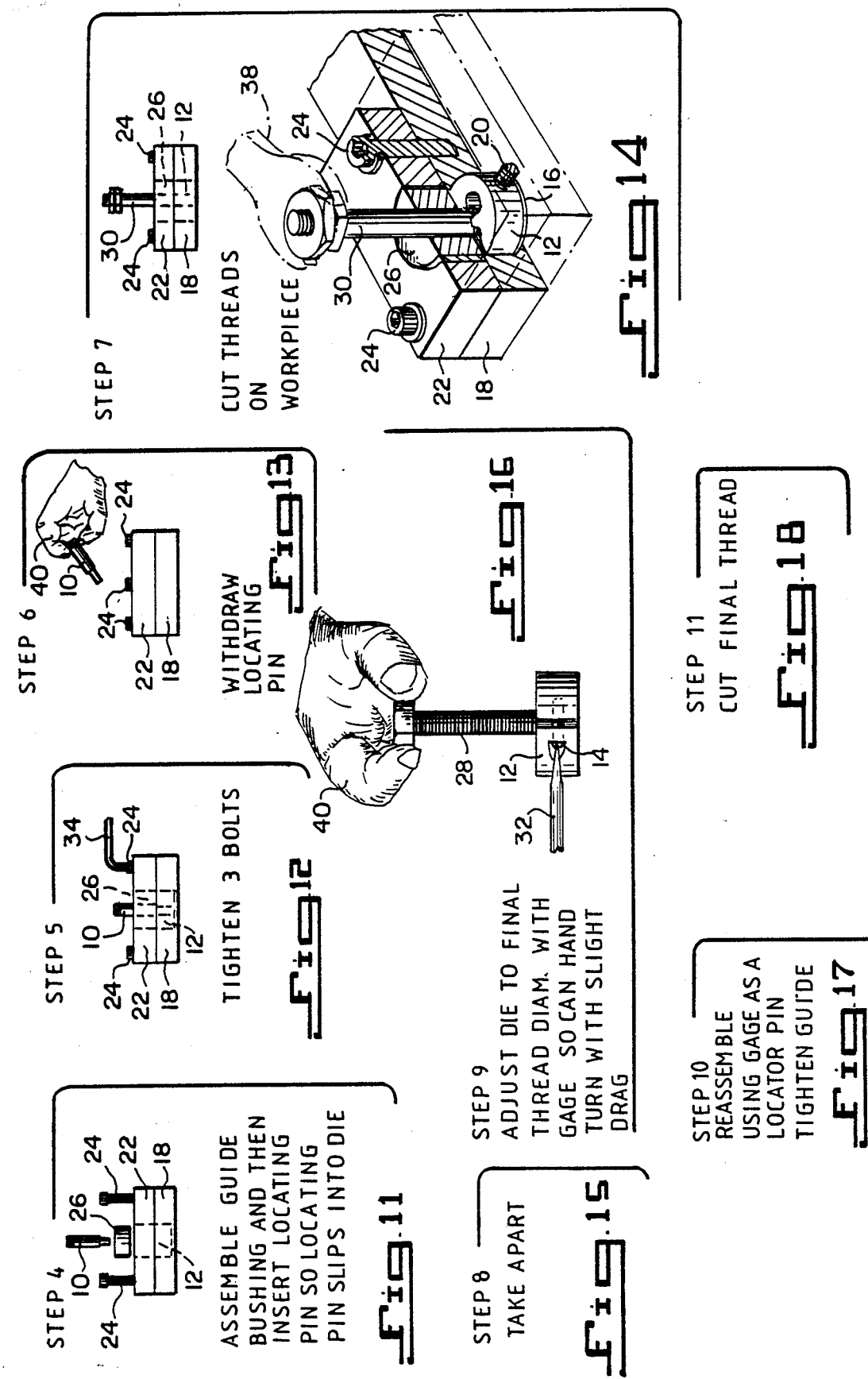

1

METHOD FOR USING A DIE HOLDER WITH CENTERING AND SQUARING GUIDE TO CUT THREADS ON A CYLINDRICAL WORKPIECE

BACKGROUND OF THE INVENTION

1. Field of the Invention

The instant invention relates generally to die stocks and more specifically it relates to a method for using a die holder with centering and squaring guide to cut threads on a cylindrical workpiece.

2. Description of the Prior Art

Numerous die stocks have been provided in prior art that are adapted to hold dies therein for cutting external threads on pipes and rods of various diameters.

While these units may be suitable for the particular purpose to which they address, they would not be as suitable for the purposes of the present invention as heretofore described.

SUMMARY OF THE INVENTION

A primary object of the present invention is to provide a method for using a die holder with centering and squaring guide to cut threads on a cylindrical workpiece that will overcome the shortcomings of the prior art devices.

Another object is to provide a method for using a die holder with centering and squaring guide to cut threads on a cylindrical workpiece in which a long bore of a guide bushing presents a lot more surface area to guide the workpiece into the die.

An additional object is to provide a method for using a die holder with centering and squaring guide to cut threads on a cylindrical workpiece which holds the workpiece absolutely square to the die throughout the operation of making a machine quality thread on the workpiece.

A further object is to provide a method for using a die holder with centering and squaring guide to cut threads on a cylindrical workpiece that is simple and easy to use.

A still further object is to provide a method for using a die holder with centering and squaring guide to cut threads on a cylindrical workpiece that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a perspective view of a die.

FIG. 2 is a perspective view of a shim.

FIG. 3 is a perspective view of a die holder being clamped in a vise.

FIG. 4 is a perspective view of a guide positioned over the die holder shown in phantom.

FIG. 5 is a perspective view of a locating pin.

FIG. 6 is a perspective view of a guide bushing.

FIG. 7 is a perspective view of a gage.

FIGS. 8 through 18 are various steps for cutting preliminary and final threads on a cylindrical workpiece.

DETAILED DESCRIPTION OF THE PREFERRED EMBODIMENTS

Turning now descriptively to the drawings, in which similar reference characters denote similar elements throughout the several views, FIGS. 1 through 7 illustrate the basic parts of the invention which includes a locating pin 10, a die 12 with adjusting screw 14, a shim 16, a die holder 18 with two lock screws 20, a guide 22, three bolts 24, a guide bushing 26 and a gage 28.

To understand how the invention is used the following operations are described and illustrated in FIGS. 8 through 18 for: (A) cutting preliminary threads on a rotatable cylindrical workpiece 30; (B) cutting final threads on the rotatable cylindrical workpiece 30; (C) cutting preliminary threads on a stationary cylindrical workpiece 30; and (D) cutting final threads on the stationary cylindrical workpiece 30.

(A) cutting preliminary threads on a rotatable cylindrical workpiece 30.

As shown in FIG. 8—step 1:
1. Place the locating pin 10 with its smaller diameter end against the starting face of the die 10 and center the pin 10 so it can just slip into the die 12 as the die is carefully adjusted open.
2. Adjust the set screw 14 in the die 12 with a screwdriver 32 for a snug fit with the locating pin 10.
3. Remove the locating pin 10 from the die 12.

As shown in FIG. 9—step 2:
4. Insert the shim 16 into the die holder 18 if necessary.
5. Insert the die 12 into the die holder 18.
6. Tighten the two lock screws 20 in the die holder 18 with an allen wrench 34 so as to lock the die 12 in place.

As shown in FIG. 10—step 3:
7. Place the guide 22 over the die holder 18.
8. Assemble loosely the three bolts 24 through the guide 22 and into the die holder 18 so that the guide 22 floats on the die holder 18.

As shown in FIG. 11—step 4:
9. Insert the guide bushing 26 into the guide 22.
10. Insert the locating pin 10 into the guide bushing 26 so that the locating pin 10 slips into the die 12.

As shown in FIG. 12—step 5:
11. Tighten the three bolts 24 with the allen wrench 34 so as to secure the guide 22 to the die holder 18.

As shown in FIG. 3:
13. Clamp the die holder 18 in a vise 36.

As shown in FIG. 14—step 7:
14. Insert the cylindrical workpiece 30 through the guide bushing 26 and into the die 12.
15. Rotate the cylindrical workpiece 30 with a wrench 38 so as to cut the preliminary threads on the workpiece 30.

(B) Cutting final threads on the rotatable cylindrical workpiece 30 after following the steps 1 to 15 in (A) above.

As indicated in FIG. 15—step 8:
1. Remove the cylindrical workpiece 30 from the die 12.
2. Release the die holder 18 form the vise 36.
3. Remove the guide bushing 26 from the guide 22.
4. Remove the three bolts 24 with the allen wrench 34 from the die holder 18 and the guide 22.

5. Lift the guide 22 off the die holder 18.
6. Loosen the two lock screws 20 in the die holder 18 with the allen wrench 34.
7. Remove the die 12 from the die holder 18.
8. Remove the shim 16 from the die holder 18.

As shown in FIG. 16—step 9:
9. Insert the gage 28 into the die 12.
10. Adjust the set screw 14 in the die 12 with the screwdriver 32 so that a hand 40 can turn the gage 28 with a slight drag.
11. Remove the gage 28 from the die 12.

As indicated in FIG. 17—step 10:
12. Insert the shim 16 into the die holder 18 if necessary.
13. Insert the die 12 into the die holder 18.
14. Tighten the two lock screws 20 into die holder 18 with the allen wrench 34 so as to lock the die 12 in place.
15. Place the guide 22 over the die holder 18.
16. Assemble loosely the three bolts 24 through the guide 22 and into the die holder so that the guide floats on the die holder 18.
17. Insert the guide bushing 26 into the guide 22.
18. Insert the gage 28 into the guide bushing 26 so that the gage 28 screws into the die 12.
19. Tighten the three bolts 24 with the allen wrench 34 so as to secure the guide 22 to the guide holder 18.
20. Withdraw the gage 28 from the guide bushing 26.

As shown in FIG. 3:
21. Clamp the die holder 18 in the vise 36.

As indicated in FIG. 18—step 11:
22. Insert the cylindrical workpiece 30 through the guide bushing 26 and into the die 12.
23. Rotate the cylindrical workpiece 30 with the wrench 38 so as to cut the final 10 threads on the workpiece 30.

(C) Cutting preliminary threads on a stationary cylindrical workpiece 30.

As shown in FIG. 8—step 1:
1. Place the locating pin 10 with its smaller diameter end against the starting face of the die 10 and center the pin 10 so it can just slip into the die 12 as the die is carefully adjusted open.
2. Adjust the set screw 14 in the die 12 with a screwdriver 32 for a snug fit with the locating pin 10.
3. Remove the locating pin 10 from the die 12.

As shown in FIG. 9—step 2:
4. Insert the shim 16 into the die holder 18 if necessary.
5. Insert the die 12 into the die holder 18.
6. Tighten the two lock screws 20 in the die holder 18 with an allen wrench 34 so as to lock the die 12 in place.
7. Place the guide 22 over the die holder 18.
8. Assemble loosely the three bolts 24 through the guide 22 and into the die holder 18 so that the guide 22 floats on the die holder 18.

As shown in FIG. 11—step 4:
9. Insert the guide bushing 26 into the guide 22.
10. Insert the locating pin 10 into the guide bushing 26 so that the locating pin 10 slips into the die 12.

As shown in FIG. 12—step 5:
11. Tighten the three bolts 24 with the allen wrench 34 so as to secure the guide 22 to the die holder 18.

As shown in FIG. 13—step 6:
12. Withdraw the locating pin 10 from the guide bushing 26.

As shown in FIG. 3:
13. Insert each of a pair of elongated handles 42 into an opposite side of the die holder 18.
14. Clamp the cylindrical workpiece 10 in the vise 36.

As shown in FIG. 14—step 7:
15. Position the cylindrical workpiece 30 to go through the guide bushing 26 and into the die 12.
16. Rotate the die holder 18 by the handles 42 so as to cut the preliminary threads on the workpiece 30.

(D) Cutting final threads on the stationary cylindrical workpiece 30 after following the steps 1 to 16 in (C) above.

As indicated in FIG. 15—step 8:
1. Remove the cylindrical workpiece 30 from the die 12.
2. Remove the guide bushing 26 from the guide 22.
3. Remove the three bolts 24 with the allen wrench 34 from the die holder 18 and the guide 22.
4. Lift the guide 22 off the die holder 18.
5. Loosen the two lock screws 20 in the die holder 18 with the allen wrench 34.
6. Remove the die 12 from the die holder 18.
7. Remove the shim 16 from the die holder 18.

As shown in FIG. 16—step 9:
8. Insert the gage 28 into the die 12.
9. Adjust the set screw 14 in the die 12 with the screwdriver 32 so that a hand 40 can turn the gage 28 with a slight drag.
10. Remove the gage 28 from the die 12.

As indicated in FIG. 17—step 10:
11. Insert the shim 16 into the die holder 18 if necessary.
12. Insert the die 12 into the die holder 18.
13. Tighten the two lock screws 20 in the die holder 18 with the allen wrench 34 so as to lock the die 12 in place.
14. Place the guide 22 over the die holder 18.
15. Assemble loosely the three bolts 24 through the guide 22 and into the die holder so that the guide floats on the die holder 18.
16. Insert the guide bushing 26 into the guide 22.
17. Insert the gage 28 into the guide bushing 26 so that the gage 28 screws into the die 12.
18. Tighten the three bolts 24 with the allen wrench 34 so as to secure the guide 22 to the guide holder 18.
19. Withdraw the gage 28 from the guide bushing 26.

As indicated in FIG. 18—step 11:
20. Position the cylindrical workpiece 30 through the guide bushing 26 and into the die 12.
21. Rotate the die holder 18 by the handles 42 so as to cut the final threads on the workpiece 30.

LIST OF REFERENCE NUMBERS 10 locating pin
12 die
14 set screw
16 shim
18 die holder
20 lock screw in 18
22 guide
24 bolt
26 guide bushing
28 gage
30 workpiece
32 screwdriver
34 allen wrench
36 vise 38 wrench
40 hand
42 elongated handle It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A method for cutting preliminary threads on a rotatable cylindrical workpiece which comprises:
   (a) opening carefully a threading die until a smaller diameter end of a locating pin can just slip into the die and then inserting the end of the pin into the die;
   (b) adjusting a set screw in the die with a screwdriver for a snug fit with the locating pin;
   (c) removing the locating pin from the die;
   (d) inserting a shim into a die holder if necessary;
   (e) inserting the die into the die holder;
   (f) tightening two lock screws in the die holder with an allen wrench so as to lock the die in place;
   (g) placing a guide over the die holder;
   (h) assembling loosely the bolts through the guide and into three securing die holder so that the guide floats on the die holder;
   (i) inserting a guide bushing into the guide;
   (j) inserting the locating pin into the guide bushing so that the locating pin slips into the die;
   (k) tightening the three bolts with the allen wrench so as to secure the guide to the die holder;
   (l) withdrawing the locating pin from the guide bushing;
   (m) clamping the die holder in a vise;
   (n) inserting a cylindrical workpiece through the guide bushing and into the die; and
   (o) rotating the cylindrical workpiece with a wrench so as to cut the preliminary threads on the workpiece.

2. A method for cutting final threads on the rotatable cylindrical workpiece after following the steps a to o in claim 1, which comprises:
   (a) removing the cylindrical workpiece from the die;
   (b) releasing the die holder from the vise;
   (c) removing the guide bushing from the guide;
   (d) removing the three bolts with the allen wrench from the die holder and the guide;
   (e) lifting the guide off of the die holder;
   (f) loosening the two lock screws in the die holder with the allen wrench;
   (g) removing the die from the die holder;
   (h) removing the shim from the die holder;
   (i) inserting a gage into the die;
   (j) adjusting the set screw in the die with the screwdriver to an extent which permits manual turning of the gage with a slight drag;
   (k) removing the gage from the die;
   (l) inserting the shim into the die holder if necessary;
   (m) inserting the die into the die holder;
   (n) tightening the two lock screws in the die holder with the allen wrench so as to lock the die in place;
   (o) placing the guide over the die holder;
   (p) assembling loosely the three bolts through the guide and into the die holder so that the guide floats on the die holder;
   (q) inserting the guide bushing into the guide;
   (r) inserting the gage into the guide bushing so that the gage screws into the die;
   (s) tightening the three bolts with the allen wrench so as to secure the guide to the die holder;
   (t) withdrawing the gage from the guide bushing;
   (u) clamping the die holder in the vise;
   (v) inserting the cylindrical workpiece through the guide bushing and into the die; and
   (w) rotating the cylindrical workpiece with the wrench so as to cut the final threads on the workpiece.

3. A method for cutting preliminary threads on a stationary cylindrical workpiece which comprises:
   (a) opening carefully a threading die until a smaller diameter end of a locating pin can just slip into the die and then inserting the end of the pin into the die;
   (b) adjusting a set screw in the die with a screwdriver for a snug fit with the locating pin;
   (c) removing the locating pin from the die;
   (d) inserting a shim into a die holder if necessary;
   (e) inserting the die into the die holder;
   (f) tightening two lock screws in the die holder with an allen wrench so as to lock the die in place;
   (g) placing a guide over the die holder;
   (h) assembling loosely three securing bolts through the guide and into the die holder so that the guide floats on the die holder;
   (i) inserting a guide bushing into the guide;
   (j) inserting the locating pin into the guide bushing so that the locating pin slips into the die;
   (k) tightening the three bolts with the allen wrench so as to secure the guide to the die holder;
   (l) withdrawing the locating pin from the guide bushing;
   (m) inserting each of a pair of elongated handles into an opposite side of the die holder;
   (n) clamping a cylindrical workpiece in a vise;
   (o) positioning the cylindrical workpiece to extend through the guide bushing and into the die; and
   (p) rotating the die holder by the handles so as to cut the preliminary threads on the workpiece.

4. A method for cutting final threads on a stationary cylindrical workpiece after following the steps a to p in claim 3, which comprises:
   (a) removing the cylindrical workpiece from the die;
   (b) removing the guide bushing from the guide;
   (c) removing the three bolts with the allen wrench from the die holder and the guide;
   (d) lifting the guide off of the die holder;
   (e) loosening the two lock screws in the die holder with the allen wrench;
   (f) removing the die from the die holder;

(g) removing the shim from the die holder;
(h) inserting a gage into the die;
(i) adjusting the set screw in the die with a screwdriver to an extent which permits manual turning of the gage with a slight drag;
(j) removing the gage from the die;
(k) inserting the shim into the die holder if necessary;
(l) inserting the die into the die holder;
(m) tightening the two lock screws in the die holder with the allen wrench so as to lock the die in place;
(n) placing the guide over the die holder;
(o) assembling loosely the three bolts through the guide and into the die holder so that the guide floats on the die holder;
(p) inserting the guide bushing into the guide;
(q) inserting the gage into the guide bushing so that the gage screws into the die;
(r) tightening the three bolts with the allen wrench so as to secure the guide to the die holder;
(s) withdrawing the gage from the guide bushing;
(t) positioning the cylindrical workpiece through the guide bushing and into the die; and
(u) rotating the die holder by the handles so as to cut the final threads on the workpiece.

* * * * *